United States Patent
Hara

(10) Patent No.: US 10,720,097 B2
(45) Date of Patent: Jul. 21, 2020

(54) DRIVER THAT OUTPUTS A RESULT OF ERROR DETECTION

(71) Applicant: SEIKO EPSON CORPORATION, Tokyo (JP)

(72) Inventor: Taro Hara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 15/896,714

(22) Filed: Feb. 14, 2018

(65) Prior Publication Data

US 2018/0240397 A1 Aug. 23, 2018

(30) Foreign Application Priority Data

Feb. 20, 2017 (JP) .................................. 2017-028858
Feb. 20, 2017 (JP) .................................. 2017-028859

(51) Int. Cl.
| | | |
|---|---|---|
| *G09G 3/30* | (2006.01) | |
| *G09G 3/36* | (2006.01) | |
| *G09G 3/20* | (2006.01) | |
| *G06F 3/048* | (2013.01) | |

(52) U.S. Cl.
CPC .............. *G09G 3/30* (2013.01); *G06F 3/048* (2013.01); *G09G 3/20* (2013.01); *G09G 3/2085* (2013.01); *G09G 2330/12* (2013.01)

(58) Field of Classification Search
CPC ................... G09G 5/14; G09G 2310/00–0297
See application file for complete search history.

(56) References Cited

U.S. PATENT DOCUMENTS

| | | | |
|---|---|---|---|
| 2007/0078922 A1 | 4/2007 | Sano et al. | |
| 2007/0279402 A1* | 12/2007 | Inada | G09G 3/2059 345/204 |
| 2012/0036418 A1 | 2/2012 | Morino et al. | |
| 2012/0182273 A1* | 7/2012 | Ninomiya | G06F 3/1431 345/204 |
| 2013/0275634 A1* | 10/2013 | Kim | G06F 13/20 710/71 |
| 2014/0009785 A1* | 1/2014 | Seki | G03G 21/14 358/1.15 |
| 2014/0160176 A1* | 6/2014 | Nose | G09G 3/3406 345/690 |
| 2015/0085912 A1* | 3/2015 | Cho | H04L 25/03885 375/232 |
| 2015/0312072 A1* | 10/2015 | Mo | H04L 27/2035 375/308 |
| 2016/0048636 A1* | 2/2016 | Warner | G06F 3/1438 345/633 |
| 2016/0111042 A1* | 4/2016 | Pyeon | G09G 3/3208 345/212 |
| 2017/0200432 A1* | 7/2017 | Hsu | G09G 5/006 |
| 2017/0309209 A1* | 10/2017 | Kenmotsu | G09G 3/3233 |

FOREIGN PATENT DOCUMENTS

| | | |
|---|---|---|
| JP | 2007-072394 A | 3/2007 |
| JP | 2007-101691 A | 4/2007 |
| JP | P2012-35677 A | 2/2012 |

* cited by examiner

*Primary Examiner* — Sanghyuk Park
(74) *Attorney, Agent, or Firm* — Oliff PLC

(57) ABSTRACT

A driver includes: an interface unit that receives image data; an error detection unit that performs error detection on the received image data; and a drive circuit that drives an electro-optical panel based on the image data. The driver outputs a result of the error detection to an external device.

16 Claims, 7 Drawing Sheets

DRIVER THAT OUTPUTS A RESULT OF ERROR DETECTION

CROSS REFERENCE

This application claims priority to Japanese Patent Application No. 2017-028858, filed Feb. 20, 2017, and Japanese Patent Application No. 2017-028859, filed Feb. 20, 2017, the entire disclosures of which are expressly incorporated herein by reference.

BACKGROUND

1. Technical Field

The present disclosure relates to drivers, electro-optical devices, electronic apparatuses, and the like.

2. Related Art

When display control is performed on a display device (liquid-crystal display device, for example), a processing device such as a CPU transmits image data and a control signal to a display controller, the display controller performs image processing and generates a timing signal, and a driver (display driver) operates based on the image data subjected to the image processing and the timing signal. The image data is transmitted using an LVDS (Low Voltage Differential Signal) method or a digital RGB method, for example. In any case, an error may occur in the image data caused by a communication error or the like. For example, in JP-A-2012-35677, JP-A-2007-101691, and JP-A-2007-72394, a method is disclosed in which a display controller performs error detection on image data received from a processing device, using CRC (Cyclic Redundancy Check).

JP-A-2012-35677, JP-A-2007-101691, and JP-A-2007-72394 disclose a method relating a display controller that performs error detection on the image data received from a processing device. A method in which, when an error occurs while transferring image data to a driver, the driver appropriately detects the error is not sufficiently disclosed in known methods. Also, a method is conceivable in which a driver computes a CRC value, and a host (display controller or processing device) reads out the CRC value. However, in this method, a host-side apparatus needs to read out a CRC value, and the host-side apparatus needs to perform processing for comparing the CRC value (computed value) with an expectation value.

SUMMARY

According to some aspects of the disclosure, a driver, an electro-optical device, electronic apparatus, and the like that can appropriately output a result of error detection performed on image data to an external device can be provided.

An aspect of the disclosure relates to a driver including an interface unit that receives image data; an error detection unit that performs error detection on the received image data; and a drive circuit that drives an electro-optical panel based on the image data. A result of the error detection is output to an external device.

According to an aspect of the disclosure, the driver that drives an electro-optical panel based on image data received via the interface unit performs error detection on the image data, and outputs the result of error detection to an external device. In this way, since the error detection in the driver becomes possible, an inadequate display being performed in the electro-optical panel can be suppressed. Furthermore, since the result of error detection can be output to an external device, the external device can easily take care of the error.

Also, according to an aspect of the disclosure, the driver may include an error output terminal for outputting a result of the error detection.

In this way, the result of error detection can be output to the external device using a predetermined terminal.

Also, according to an aspect of the disclosure, the interface unit may output a result of the error detection to the external device.

In this way, the result of error detection can be output to the external device via the interface unit.

Also, according to an aspect of the disclosure, the interface unit may receive the image data to which dummy data for making a computed value in the error detection a fixed value is added from the external device, and the error detection unit may perform the error detection by detecting whether or not the computed value in the error detection matches the fixed value.

In this way, the expectation value need not be received frame by frame, and highly accurate error detection or the like can be performed.

Also, according to an aspect of the disclosure, in the case where the driver has been set to be a master, the interface unit outputs a result of error detection received from another driver that has been set to be a slave, to the external device.

In this way, the results of error detection performed in a plurality of drivers are sent to a driver that has been set to a master, and the driver can collectively output the results.

Also, according to an aspect of the disclosure, the error detection unit may perform the error detection at a sensitivity that is different from a sensitivity of error detection in another driver that drives the electro-optical panel.

In this way, in the case where a plurality of drivers are used, the sensitivity of error detection can be flexibly set in each driver.

Also, according to an aspect of the disclosure, the interface unit may output a result of error detection performed in a scan driver that drives a scan line of the electro-optical panel to the external device.

In this way, the result of error detection performed in the scan driver can be output from the driver (source driver).

Also, according to an aspect of the disclosure, the error detection unit may perform the error detection on upper m bits out of n bits of the image data, and may not perform the error detection on lower n−m bits.

In this way, the amount of data to be the target of the error detection can be reduced, and the processing load in the error detection can be reduced.

Also, according to an aspect of the disclosure, the error detection unit may perform the error detection on the image data for a warning information display region out of a display region of the electro-optical panel.

In this way, the error detection or the like can be appropriately performed on image data of a region in which important information is to be displayed.

Also, according to an aspect of the disclosure, the driver may include a control unit that performs control to drive the drive circuit. The control unit, when a signal abnormality or connection abnormality has been detected k times (k is a positive integer), may perform control to turn off display, and when an error has been detected j times (j is an integer that satisfies j>k) by the error detection unit, perform control to turn off the display.

In this way, when a signal abnormality or connection abnormality is detected, or when an error is detected, inadequate display can be suppressed, and the control condition can be flexibly set depending on which of a signal abnormality or connection abnormality, or an error in image data has occurred.

Also, according to an aspect of the disclosure, the interface unit may include: a display interface unit that receives the image data; and a command interface unit that receives display setting data. The error detection unit may perform error detection on the display setting data received by the command interface unit.

In the way, the target of the error detection can be extended in addition to the image data.

Another aspect of the disclosure relates to an electro-optical device including: the driver according to any of the above descriptions; the electro-optical panel; and the external device.

Also, according to another aspect of the disclosure, the electro-optical device may further include a second driver that is different from the driver. The sensitivity of error detection in the driver may be higher than the sensitivity of error detection in the second driver.

In this way, in the case where a plurality of drivers are used, the sensitivity of error detection can be flexibly set for each of the drivers.

Another aspect of the disclosure relates to an electronic apparatus including the driver according to any of the above descriptions.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The following describes embodiments of the disclosure in detail. Note that the following embodiment is not intended to unreasonably limit the content of the invention that is described in the claims, and not all configurations that are described in the present embodiment are necessarily essential as solving means of the invention.

1. Exemplary System Configuration

Figure 1:
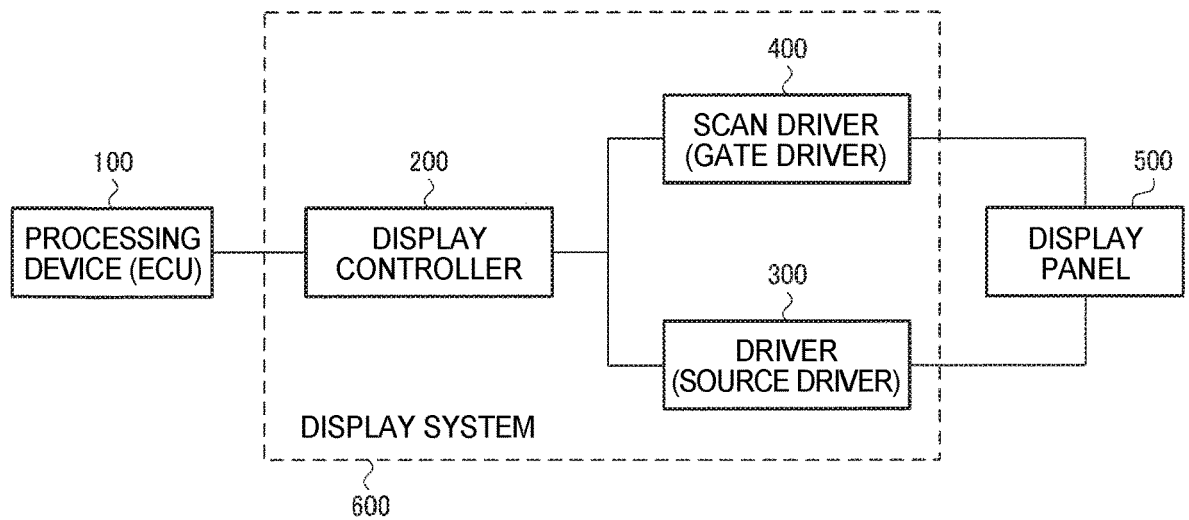
FIG. 1 is an exemplary system configuration.

FIG. 1 is an exemplary configuration of a system including a driver 300 of the present embodiment. The system includes the driver 300 (source driver), a scan driver 400 (gate driver), a display controller 200, a processing device 100, and a display panel 500 (electro-optical panel), as shown in FIG. 1. The display panel 500 is driven by the driver 300. The driver 300 is connected to the display controller 200. The driver 300 may be connected to the processing device 100, as will be described later in FIG. 2.

The display controller 200 is connected to the processing device 100. Note that, although an example in which one driver 300 is included is shown in FIG. 1, the system (display system 600) according to the present embodiment may include a plurality of drivers 300. An example in which a plurality of drivers 300 are included will be described later using FIGS. 5 and 6.

When the system in FIG. 1 is installed in an automobile or the like, the processing device 100 is an ECU (Electronic Control Unit). Alternatively, when the above-mentioned system is installed in an electronic apparatus such as an information communication terminal, the processing device 100 is a processor such as a CPU (Central Processing Unit) or a microprocessor.

Figure 2:
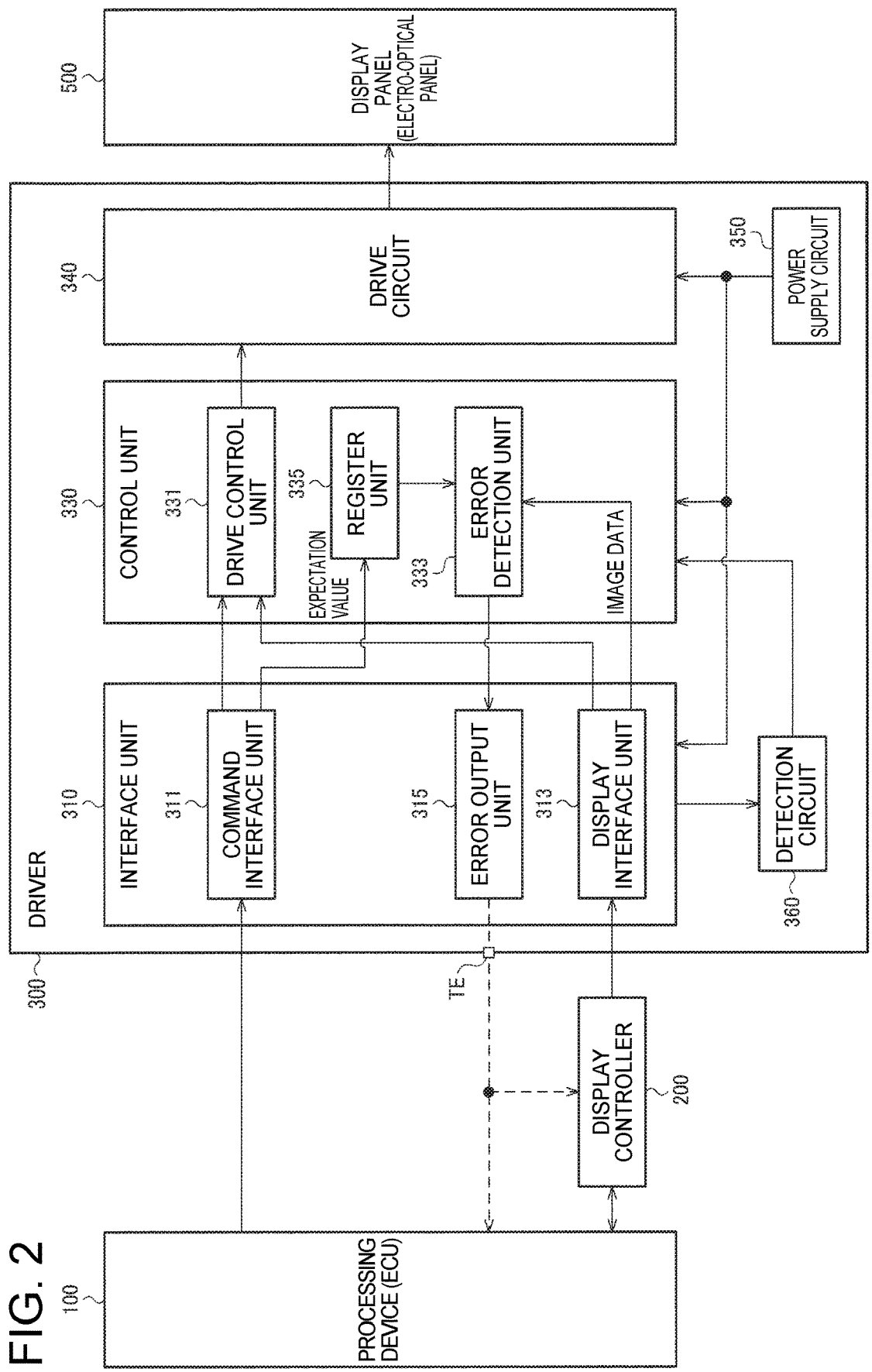
FIG. 2 is an exemplary configuration of a driver.

An exemplary configuration of the driver 300 (data line drive circuit, source driver) of the present embodiment is shown in FIG. 2. The driver 300 includes an interface unit (interface) 310, a control unit (controller, control circuit) 330, a drive circuit 340, a power supply circuit 350, and a detection circuit 360. The driver 300 is realized by an integrated circuit device (IC) or the like, for example.

The interface unit 310 may include a command interface unit 311, a display interface unit 313, and an error output unit 315. The interface unit 310 communicates with the display controller 200 (such as MPU, CPU, ASIC, for example, an external processing device in a broad sense). The command interface unit 311 receives commands (control signal, display setting data). The display interface unit 313 receives image data (display data). The error output unit 315 (error output circuit) performs output processing based on a result of error detection performed by the error detection unit 333.

An LVDS (Low Voltage Differential Signal) method, an RGB serial method, a transmission method of the display port standard can be adopted as the communication method of the image data. An I2C method, a three-wire or four-wire serial transmission method, or the like can be adopted as the communication method of the commands and control signals. The interface unit 310 is constituted by an input/output buffer circuit and a control circuit (such as PLL circuit in the LVDS method, for example) so as to realize such a communication method.

The control unit 330 includes a drive control unit 331, an error detection unit (error detector) 333, and a register unit 335. The register unit 335 (register, in a broad sense, storage unit or memory) stores commands and control signals that have been input via the interface unit 310. Also, the communication of commands and control signals may be realized by a terminal setting (method in which a control signal is input by applying a signal at a high level or a low level to each terminal). The register unit 335 stores an expectation value (expectation value of CRC value, in a narrow sense) in the error detection performed by the error detection unit 333. The expectation value here may be a fixed value, as will be described later.

The error detection unit 333 performs error detection (first error detection) on the data received by the interface unit 310. Hereinafter, an example in which the error detection unit 333 performs error detection processing using a CRC (Cyclic Redundancy Check) will be described. Note that the method of error detection is not limited to the CRC, and a method such as checksum can be adopted, for example. A specific example of the error detection processing will be described later.

Also, the control unit 330 (drive control unit 331) performs image data processing, timing control, control of the units of the driver 300 based on image data, a command (control signal), and the like that have been input from the display controller 200. In the image data processing, processing for extracting display data of each color component channel from the data that has been transferred from the display controller 200, image processing such as tone correction, and the like are performed, for example. In the timing control, a timing control signal is generated based on a clock signal and the image data that have been input from the display controller 200, and the drive timing (selection timing) of a scan line (gate line) and the drive timing of a data line of the display panel 500 are controlled based on the timing control signal. The control unit 330 is constituted by a logic circuit such as a gate array, for example.

The drive circuit 340 includes a tone voltage generation circuit, a plurality of D/A converter circuits, and a plurality of amplifier circuits. The tone voltage generation circuit outputs a plurality of voltages, and the voltages are respectively associated with a plurality of tone values. Each D/A converter circuit selects a voltage corresponding to the image data from the plurality of voltages from the tone voltage generation circuit. Each amplifier circuit outputs a data voltage based on the voltage from the corresponding D/A converter circuit. For example, a D/A converter circuit and an amplifier circuit are provided so as to be associated with one data line (source line) of the display panel 500, and the data line is driven by its amplifier circuit. Alternatively, a D/A converter circuit and an amplifier circuit may be provided so as to be associated with two data lines of the display panel 500, and dot inversion driving may be performed by the amplifier circuit driving the two data lines at opposite polarities. The tone voltage generation circuit is constituted by a ladder resistor or the like, for example, the D/A converter circuit is constituted by a switch circuit or the like, for example, and the amplifier circuit is constituted by an operational amplifier, a capacitor, or the like, for example.

The power supply circuit 350 generates various voltages based on power supply voltages (first power supply voltage VDD and a second power supply voltage VSS, for example) supplied from a system power supply, and supplies the voltages to the units of the driver 300 as the respective power supply voltages. For example, positive and negative power supply voltages (power supply voltages used for positive electrode driving and negative electrode driving in the dot inversion driving) for the amplifier circuits, and a power supply voltage for the tone voltage generation circuit are supplied to the drive circuit 340, for example. Also, a power supply voltage for logic circuits is supplied to the control unit 330. Also, the power supply circuit 350 supplies a common voltage of the display panel 500 to a common electrode of the display panel 500. Also, the power supply circuit 350 supplies a substrate voltage of a semiconductor substrate (P-type substrate) of the driver 300.

The power supply circuit 350 is constituted by a step-up circuit (charge pump type step-up circuit, for example), a linear regulator (LDO (Low Drop-Out) regulator, for example), a switch element for discharging, and the like.

The detection circuit 360 detects whether or not a clock signal for image data transfer that is supplied from the display controller 200 has stopped or not, and activates a detection signal upon detecting that it has stopped. Then, upon the detection signal being activated, the control unit 330 causes the display panel 500 to enter a display off state (full-black display, for example).

As shown in FIG. 2, the driver 300 according to the present embodiment includes the interface unit 310 that receives image data, the error detection unit 333 that performs error detection on the received image data, and the drive circuit 340 that drives the electro-optical panel (display panel 500) based on the image data. Also, the driver 300 outputs the result of error detection to an external device.

According to the method of the present embodiment, error detection can be performed on the image data that the driver 300 has received, and the result of the error detection can be output to the external device. As a result of performing error detection on the image data, display of an inadequate image in the display panel 500 or the like can be suppressed. In the case of an in-vehicle system in which very important information relating to the safety of a user such as a warning is envisioned to be displayed, the erroneous display of information can be suppressed. Standards such as ISO 26262 have been established with respect to the electric system of a vehicle. In ISO 26262, risks specific to automobiles are sorted by importance using ASIL (Automotive Safety Integrity Level). In vehicles of recent years, various pieces of information including warning information are output using a high resolution electro-optical panel. Therefore, the importance of the display system has increased, and it is important to suppress the display of inadequate information, from the viewpoint of the safety function of vehicles.

At that time, the driver 300 not only performs error detection, but also outputs the result of error detection to an external device. The external device to be an output target may be the display controller 200, the processing device 100, or both of them, as shown by broken lines in FIG. 2. That is, the result of error detection performed on image data by the driver 300 can be easily shared by an external device, and the external device can perform processing (such as re-transmission of image data and stopping of display) according to the error.

The interface unit 310 may output the error detection result to the external device. For example, in the case where the interface unit 310 includes the command interface unit 311 and the display interface unit 313, the interface unit 310 outputs the error detection result using an interface similar to the interface that is used when commands, control signals, and image data are transmitted and received. As a result of using the interface for commands and the like for outputting the result of error detection, a terminal for outputting errors need not be provided, and an increase in the number of terminals can be suppressed.

Alternatively, as shown in FIG. 2, the driver 300 may include an error output terminal TE for outputting a result of error detection. The error output unit 315 outputs a signal that is activated or inactivated (high level/low level) according to the result of error detection to the error output terminal TE.

In this way, the external device can acquire the result of error detection performed by the driver 300 using the signal level at the error output terminal TE. Therefore, there is no need to perform control so as to store the error detection result in a given region of the register unit 335 in the driver 300, and cause the external device to read out the given region of the register unit 335. That is, the external device can easily acquire the result of error detection performed by the driver 300.

The scan driver 400 outputs a scan line drive voltage to a scan line of the display panel 500 so as to drive (select) the scan line. The display panel 500 is a dual gate display panel, for example. In the dual gate display panel, two scan lines are provided in association with one display line in a horizontal scan direction, and a pixel that is selected by one scan line of the two scan lines and a pixel that is selected by the other scan line (two pixels adjacent to each other in one display line) shares one data line. The scan driver 400 drives two scan lines in a time division manner in one horizontal scan period, and the driver 300 outputs data voltages for the two pixels to the data line in a time division manner in association with the selection of the two scan lines. Note that the method of the disclosure can be applied not only to the dual gate display panel 500, but also to a case where various display panels are driven.

Although a detailed description of the configuration of the scan driver 400 will be omitted, the scan driver 400 may include a control unit and a power supply circuit, similarly to the driver 300, for example. Alternatively, the scan driver 400 (drive circuit) may be operated by the control unit 330 and the power supply circuit 350 of the driver 300. For example, the power supply circuit 350 of the driver 300 may supply a positive power supply voltage and a negative power supply voltage to the scan driver 400.

Figure 3:
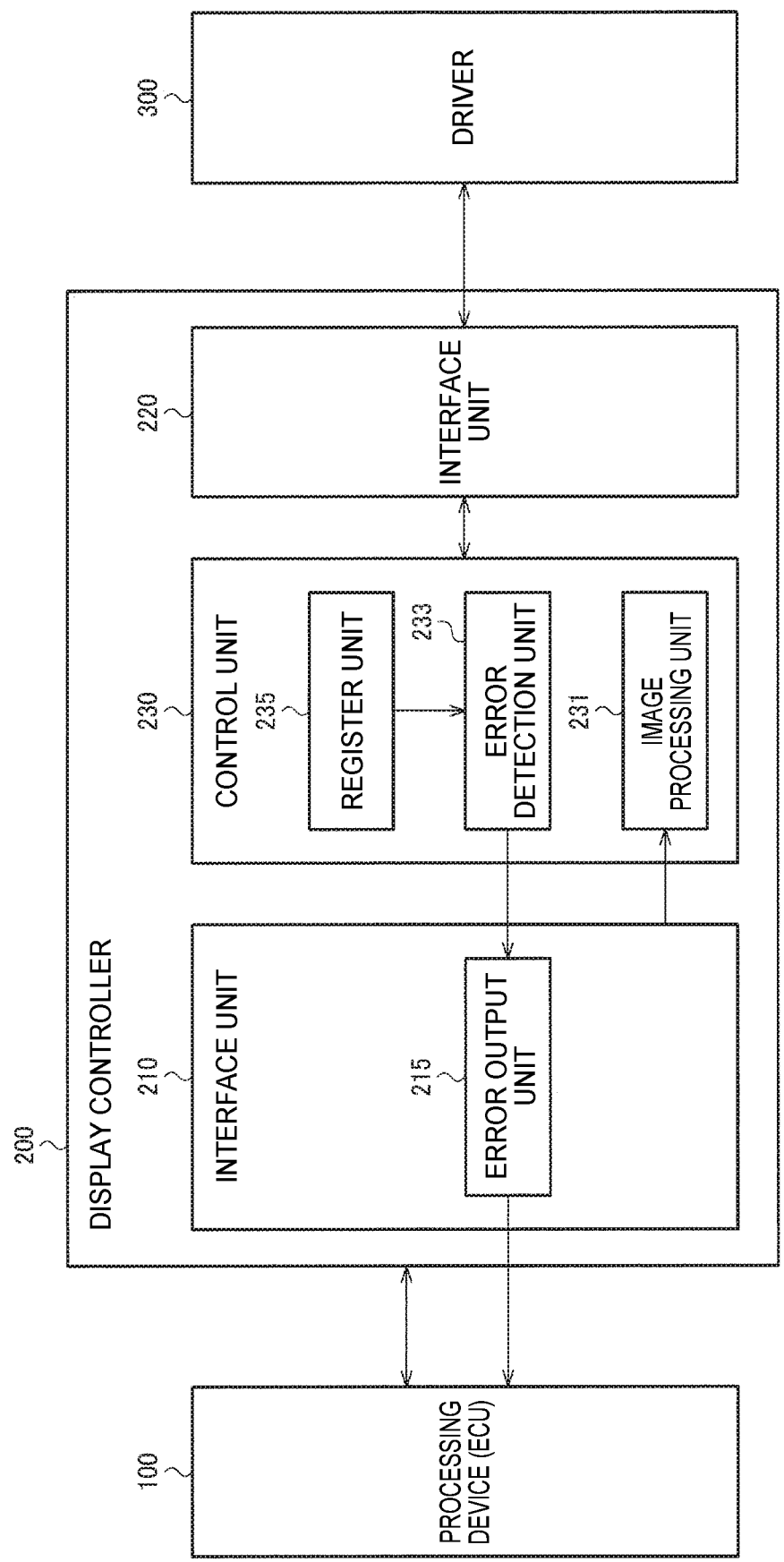
FIG. 3 is an exemplary configuration of a display controller.

FIG. 3 shows an exemplary configuration of the display controller 200 (circuit device). The display controller 200 includes interface units 210 and 220 (interface circuit) and a control unit 230 (control circuit). The display controller 200 is realized by an integrated circuit device (IC), for example.

The interface unit 210 performs communication between the processing device 100 and the display controller 200. For example, the interface unit 210 receives image data and timing control signals (such as a clock signal, vertical synchronizing signal, horizontal synchronizing signal, and data enable signal, for example) that are transmitted from the processing device 100 to the control unit 230. A method similar to that of the interface unit 310 can be adopted as the communication method.

Also, the processing device 100 may perform writing to a register unit 235 included in the control unit 230. In this case, the interface unit 210 receives a register value that is to be written to the register unit 235 from the processing device 100. Also, the interface unit 210 may include an error output unit 215 (error determination information output circuit), and transmit error determination information (error signal, error detection signal) that is output by the error output unit 215 to the processing device 100.

The control unit 230 controls the units of the display controller 200. Specifically, the control unit 230 may perform timing control, and performs control of the units of the display controller 200, and generates control signals (such as clock signal, vertical synchronizing signal, horizontal synchronizing signal, and data enable signal, for example) to be transmitted to the driver 300, based on the timing control signal from the processing device 100.

Also, the control unit 230 may include an image processing unit 231 (image processing circuit), an error detection unit 233 (error detection circuit), and a register unit 235 (register, storage unit). The image processing unit 231 performs various types of image processing (such as tone correction) and data formatting processing (processing for generating transmission data that conforms to the data reception method of the driver 300) on the image data (display data) from the processing device 100.

The error detection unit 233 performs error detection (second error detection) on the image data from the processing device 100. A specific example of the error detection processing will be described later.

The error output unit 215 outputs error determination information based on the output (a CRC value or a signal of result of comparison between a CRC value and an expectation value) of the error detection unit 233. Outputting error determination information is to output an error signal to the processing device 100, for example. The error signal here may be an interrupt request signal (IRQ: Interrupt ReQuest), for example. Alternatively, the error signal may be a signal (that is activated when an error has been determined) simply indicating that an error has been determined.

The interface unit 220 of the display controller 200 communicates with the driver 300 (above-mentioned interface unit 310, in a narrow sense). For example, the interface unit 220 transmits image data output by the image processing unit 231, to the driver 300, and transmits control signals (timing control signal) that the control unit 230 outputs to the driver 300. Also, the interface unit 220 may transmit display setting data (mode setting signal, for example) for controlling the operation of the driver 300 to the driver 300.

The image processing unit 231, the error detection unit 233, the register unit 235, and the error output unit 215 of the above-mentioned control unit 230 are each constituted by a logic circuit (gate array in which gate circuits such as an AND circuit, an OR circuit, and an inverter circuit and functional circuits such as a flip-flop circuit are placed, for example). The image processing unit 231, the error detection unit 233, the register unit 235, and the error output unit 215 each represent a functional block, and may be implemented as an integrated logic circuit, as hardware, or may be implemented as separate logic circuits.

Alternatively, each above-mentioned unit may be realized by software. That is, the processing of the display controller 200 (circuit device) and the like of the present embodiment may be partly or mostly realized by a program. In this case, the display controller 200 and the like of the present embodiment are realized by a processor such as a CPU executing a program. Specifically, a program stored in a non-transitory information storage medium is read out, and a processor such as a CPU executes the read-out program. Here, the information storage medium (computer readable medium) is a medium that stores a program, data, and the like, and the function thereof can be realized by an optical disk (such as DVD or CD), an HDD (hard disk drive), a memory (such as card-type memory or ROM), or the like. A processor such as a CPU performs various types of processing of the present embodiment based on a program (data) stored in the information storage medium. That is, a program (program for causing the computer to execute processing for each unit) for causing a computer (device including an operation unit, a processing unit, a storage unit, and an output unit) to function as each unit of the present embodiment is stored in the information storage medium. Also, the point that the function of each unit may be realized by software is similarly applied to the driver 300.

The method of the present embodiment can be applied to the display system 600 that includes the display controller 200 that receives first image data from the processing device 100 and performs display timing control, and the driver 300 that is controlled by the display controller 200, receives second image data from the display controller, and drives the electro-optical panel (display panel 500). Also, as described using FIGS. 2 and 3, the display controller 200 performs the first error detection on the first image data, and the driver 300 performs the second error detection on the second image data. Note that, in the display controller 200, the data format of the first image data can be changed, and various types of image processing can be performed on the first image data. Therefore, the second image data indicates data that has been transmitted to the driver 300 after image processing has been performed on the first image data in the display controller 200 (image processing unit 231).

In this way, in the case where the display controller 200 and the driver 300 are provided separately (separate ICs), as shown in FIG. 1, error detection can be performed on the image data in each of the units. Communication of image data via an interface is performed between the processing device 100 and the display controller 200, as well as between the display controller 200 and the driver 300, and therefore an error may occur in these communications. In this regard, as a result of performing both of the first error detection and the second error detection, the accuracy of detecting errors can be improved compared with a case where only one detection is performed, and unsuitable image data being displayed in the display panel 500 can be suppressed.

As shown in FIGS. 2 and 3, the display controller 200 includes the first interface unit (interface unit 210) for receiving first image data from the processing device 100 and the first error detection unit (error detection unit 233) that performs the first error detection on the first image data. Also, the driver 300 includes the second interface unit (interface unit 310) for receiving second image data from the display controller 200, and the second error detection unit (error detection unit 333) that performs the second error detection on the second image data. As a result of being configured in this way, the display controller 200 and the driver 300 can each perform error detection on the image data.

Also, the error detection result may be output to an external device, in this case as well. For example, the display controller 200 outputs the result of the first error detection to the processing device 100, and the driver 300 outputs the result of the second error detection to the display controller 200 or the processing device 100.

In this way, since the results of the first and second error detections can be output to another device, various types of processing for handling an error (exception processing) and the like can be performed.

2. Specific Example of Error Detection

The error detection in the present embodiment is, specifically, to check whether or not the image data that a first device transmits to a second device matches the image data that is actually received by the second device (detection of communication error). When the CRC is used in the error detection, the second device acquires the CRC value that has been computed from the image data to be transmitted from the first device to the second device as an expectation value. The error detection in the second device is processing for determining whether or not the CRC value (computed value) computed from the image data that the second device has actually received matches the expectation value. Various specific methods are conceivable. In the case where each pixel is assigned with n bits (n=8, for example) for each of R, G, B data, for example, the second device may acquire an expectation value based on the R pixel value, an expectation value based on the G pixel value, and an expectation value based on the B pixel value as the expectation value, and may perform computation of the CRC value and determination as to whether the CRC value matches the expectation value for each of the colors R, G, and B as the target.

In the case where an above-mentioned error detection is the error detection (second error detection) performed in the error detection unit 333 of the driver 300, the above-mentioned first device is the display controller 200 (or the processing device 100), and the above-mentioned second device is the driver 300. Also, in the case where an above-mentioned error detection is the error detection (first error detection) performed in the error detection unit 233 of the display controller 200, the above-mentioned first device is the processing device 100 and the above-mentioned second device is the display controller 200.

Hereinafter, a specific example of the first error detection and the second error detection will be described. Note that the processing described below is an example of error detection, and various modifications can be implemented. For example, the processing described as the first error detection may be performed in the second error detection, and the processing described as the second error detection may be performed in the first error detection. Also, a plurality of types of error detection may be combined.

2.1 Example of Error Detection in Driver

First, a specific example of the error detection (second error detection) performed in the driver 300 will be described. Note that the driver 300 may perform some type of image processing (such as gamma correction, for example) on image data acquired from the external device, and drive the display panel 500 based on the processed data. In this case, it is preferable that the error detection is performed on the image data before the image processing. The information (expectation value or dummy data for making the expectation value a fixed value) to be used for the error detection is transmitted from the external device, and the information is a value that is obtained assuming that the error detection is performed on the image data when transmitted from the external device. That is, it is natural that the data to be the target of the error detection is pre-image processing data.

Fixed Expectation Value

As described above, in the error detection, an expectation value (expectation value of CRC value) for error detection is needed. The CRC value changes according to the image data, and therefore the expectation value normally changes frame by frame. Therefore, the display controller 200 may compute the expectation value based on the image data in each frame, and transmit the computed expectation value to the driver 300 along with the image data.

However, an error (communication error) may occur not only in the image data, but also in the expectation value. Therefore, the expectation value that the driver 300 receives in each frame cannot be said to be sufficiently reliable, and when an error occurs in the expectation value, error detection cannot be appropriately performed in the driver 300.

Therefore, in the present embodiment, the display controller 200 outputs image data (second image data) in which dummy data is added such that the computed value in the error detection is to be a fixed value to the driver 300.

In this case, the interface unit 310 of the driver 300 receives image data in which dummy data is added such that the computed value in the error detection is to be a fixed value from the external device (display controller 200), and the error detection unit 333 performs the error detection by detecting whether or not the computed value in the error detection matches the fixed value.

In this way, once the driver 300 is able to acquire a fixed value, the fixed value can be continuously used over a plurality of frames. Because the occurrence of an error in communication of the expectation value can be suppressed, highly accurate error detection is enabled. This fixed value may be received from the processing device 100 via the command interface unit 311, for example. The value to which the expectation value is fixed is known in a design stage, and the driver 300 can acquire the fixed value from the processing device 100 as a control parameter. Note that modifications such as the fixed value being received from the display controller 200 via the display interface unit 313 and the fixed value being stored in the register unit 325 when the driver 300 is manufactured may be implemented.

Various methods for generating dummy data are conceivable. Following processes (1) to (3) may be performed, as an example. Note that, here, the computed value of the CRC is assumed to be q bits (generator polynomial is q+1 bits).

(1) Bit string A of p+q bits is generated by adding a bit string constituted by q "0"s to the rear end of the image data of p bits, which is the error detection target. (2) A CRC value B of q bits is obtained from the bit string A. (3) A CRC value B of q bits is used as the dummy data (bit string C of p+q bits in which the CRC value B is added to the bit string A is image data+dummy data).

In computation of the CRC in genera the remainder obtained when the bit string of the error detection target is divided by a bit string representing the generator polynomial (strictly, division without a carry or borrow, computation in modulo 2) is the CRC value. That is, as a result of adding the CRC value (remainder) obtained in (2) to the original bit string A, the remainder obtained when the bit string C after addition is divided is necessarily 0. Accordingly, the expectation value for the error detection performed on the image data (bit string C), as the target, in which dummy data is added can be fixed to 0.

Note that, here, the fixed value is set to 0, but the fixed value is not limited to 0, and can be set to any number that can be expressed by q bits. Also, here, the bit number of the dummy data is set to be the same as that of the CRC value (=the length of the generator polynomial-1). For example, in the case of CRC-8 in which 9-bit generator polynomial is used, the dummy data has 8 bits, and in the case of CRC-16 in which 17-bit generator polynomial is used, the dummy data has 16 bits. Note that it is sufficient that the data for making the computed value in error detection to be a fixed value has a length that is at least the same as the CRC value, and data having a bit string that is longer than the CRC value may be used as the dummy data. For example, the length of the dummy data may be set based on the transfer unit in the interface unit 310 or the processing unit in the driver 300 (control unit 330).

Note that the method of the present embodiment can be applied to the display controller 200 that includes an interface unit 220 that transmits image data to the driver 300, and the control unit 230, the control unit 230 performing control such that the dummy data for making the computed value a fixed value, in the error detection that is performed on image data in the driver 300, is added to the image data, and the interface unit 220 transmitting the image data to which the dummy data is added to the driver 300.

Targeting Image Data of Warning Information Display Region

The error detection of the present embodiment may be applied to the entirety of image data. In other words, the error detection unit 333 may perform error detection on the image data for the entirety of the display region of the electro-optical panel (display panel 500). Note that, in the electro-optical panel, in many cases, the importance of information to be displayed in a given region may differ from that of information to be displayed in the other region.

For example, warning information for, when an abnormality occurs in the system (electronic apparatus, mobile body), warning a user of the abnormality may be displayed in a given region (hereinafter, warning information display region) of the electro-optical panel. In this case, the information to be displayed in the warning information display region of the electro-optical panel is more important than the information to be displayed in other regions. That is, the necessity to perform error detection on the image data for the warning information display region is higher than the need to perform error detection on the image data of the other regions. If the error is not corrected, information that is different from the information that should be displayed is displayed.

Therefore, the error detection unit 333 may perform error detection on the image data for the warning information display region of the display region of the electro-optical panel. In this way, the error detection can be prioritized to be performed on an important region. Furthermore, with respect to the error detection to be performed on the image data for regions other than the warning information display region, the frequency of error detection can be lowered, or the error detection can be omitted. That is, as a result of limiting the display region (amount of image data) to be the target of the error detection, the processing load can be reduced.

Note that, even if the error detection is limited to the warning information display region, the image data corresponding to the entirety of the display region of the electro-optical panel is needed to display an image in the display panel 500. That is, in the case of performing error detection in the warning information display region, information for specifying image data that corresponds to the warning information display region is required. Therefore, the interface unit 310 acquires position information for specifying the warning information display region from the external device. This position information is a piece of information that is represented by the coordinate values on an upper left side of the rectangular warning information display region and the coordinate values on a lower right side thereof, for example.

Also, the display controller 200 adds dummy data to the image data for the warning information display region such that the computed value in the error detection is to be a fixed value. In this way, the error detection unit 333 of the driver 300 can specify the image data of the warning information display region, which will be the target of the error detection, and the expectation value of the computed value, and as a result, the error detection targeted to the warning information display region can be appropriately executed.

Targeting Upper m Bits

When suppressing the data amount of the image data to be the target of the error detection is considered, a method that is different from the method of limiting the region may be used. For example, the error detection unit 333 may perform error detection on the upper m bits out of n bits of image data, and may not perform error detection on the lower n−m bits.

Here, upper and lower respectively indicates an MSB side and an LSB side of R, G, and B pixel values when focused on a given one pixel. For example, in the case where an 8-bit R pixel value, an 8-bit G pixel value, and an 8-bit B pixel value are assigned to one pixel, n=8 and upper m (an integer of one to seven inclusive) bits indicate m bits (m bits from the most significant bit) of the 8-bit R pixel value on the MSB side, m bits of the B pixel value on the MSB side, and m bits of the G pixel value on the MSB side.

The value of a bit on the high order side (MSB side) contributes more to the pixel value, and the value of a bit on the low order side (LSB side) contributes less. In the case of the above-mentioned 8 bits, if an error occurs in the most significant bit, the pixel value changes by 128, but the pixel value changes only by one even if an error occurs in the least significant bit. When the pixel value changes a little, the color of the corresponding pixel changes a little. That is, even if an error occurs in a bit on a lower side, the influence on recognition by a user is small.

Therefore, in the present embodiment, the target of error detection may be limited to upper m bits. In the case where the region (the entirety of the display region of the electro-optical panel or warning information display region as described above) to be the target of the error detection is r×s pixels constituted by r pixels vertically and s pixels horizontally, if all bits are targeted, the error detection needs to be performed on r×s×n bits for each of the R, G, B colors. In this regard, by limiting the targeted bits to the upper m bits, the error detection may be merely performed on r×s×m (<r×s×n) bits as the target. That is, the amount of data to be the target of the error detection can be reduced, and the processing load for error detection can be reduced. Here, since the high order side or the low order side is taken into consideration, the error detection is appropriately targeted at bits having higher importance, and bits having lower importance can be removed from the error detection.

Detecting Error in Display Setting Data

In the above, an example in which the target of error detection is image data acquired via the display interface unit 313 has been described. However, as shown in FIG. 2, the interface unit 310 may include the command interface unit 311 in addition to the display interface unit 313 for receiving image data. The command interface unit 311 receives display setting data from the external device (processing device 100 or display controller 200). The display setting data, here, is data (parameter) used for display setting in the driver 300, and includes data for setting a display timing, for example.

In this case, the display setting data is also acquired through communication via the interface unit 310, and an error (communication error) may occur. Therefore, the error detection unit 333 may perform error detection on the display setting data received by the command interface unit 311.

In this way, the target of error detection can be expanded in addition to the image data. As a result of performing error detection on the display setting data, display control based on unsuitable setting data can be suppressed. For example, the display timing can be prevented from shifting from an original timing.

Counting by Error Output Unit

The error output unit 315 outputs an error detection result based on a result of detection by the error detection unit 333. The result of detection by the error detection unit 333 is, in a narrow sense, information indicating whether or not the computed value (CRC value) in the error detection matches the expectation value. Here, the error output unit 315 may output an error when the error detection unit 333 has determined that the computed value does not match the expectation value (hereinafter, may be referred to as CRC error as well).

However, according to a communication standard, a bit error is allowed to occur with some frequency. Also, the image data to be the target of the error detection is a bit string whose bit number is the number of pixels×24 bits, and even if the error detection region is limited to the warning information display region, the data amount is substantial. As a result, the CRC error itself occurs at a frequency of once every several tens of frames, and if the error output unit 315 outputs an error as a result of one CRC error, the sensitivity to the error becomes excessively high.

Accordingly, the error output unit 315 may count the number of times the error detection unit 333 has detected the CRC error, and may output an error when the count number has reached a predetermined threshold value or more. In other words, the error output unit 315 does not immediately determine that an error has occurred when the CRC error has occurred once, and outputs an error when the CRC error has occurred a predetermined times. Here, the count number may be the accumulated number of error occurrences or the number of successive error occurrences.

2.2 Exemplary Error Detection in Display Controller

Next, a specific example of error detection (first error detection) performed in the display controller 200 will be described. Note that the display controller 200 can also perform some types of image processing on image data acquired from the processing device 100, but the error detection may be performed on image data before image processing as the target.

Flexible Setting of Error Detection Region

Figure 4:
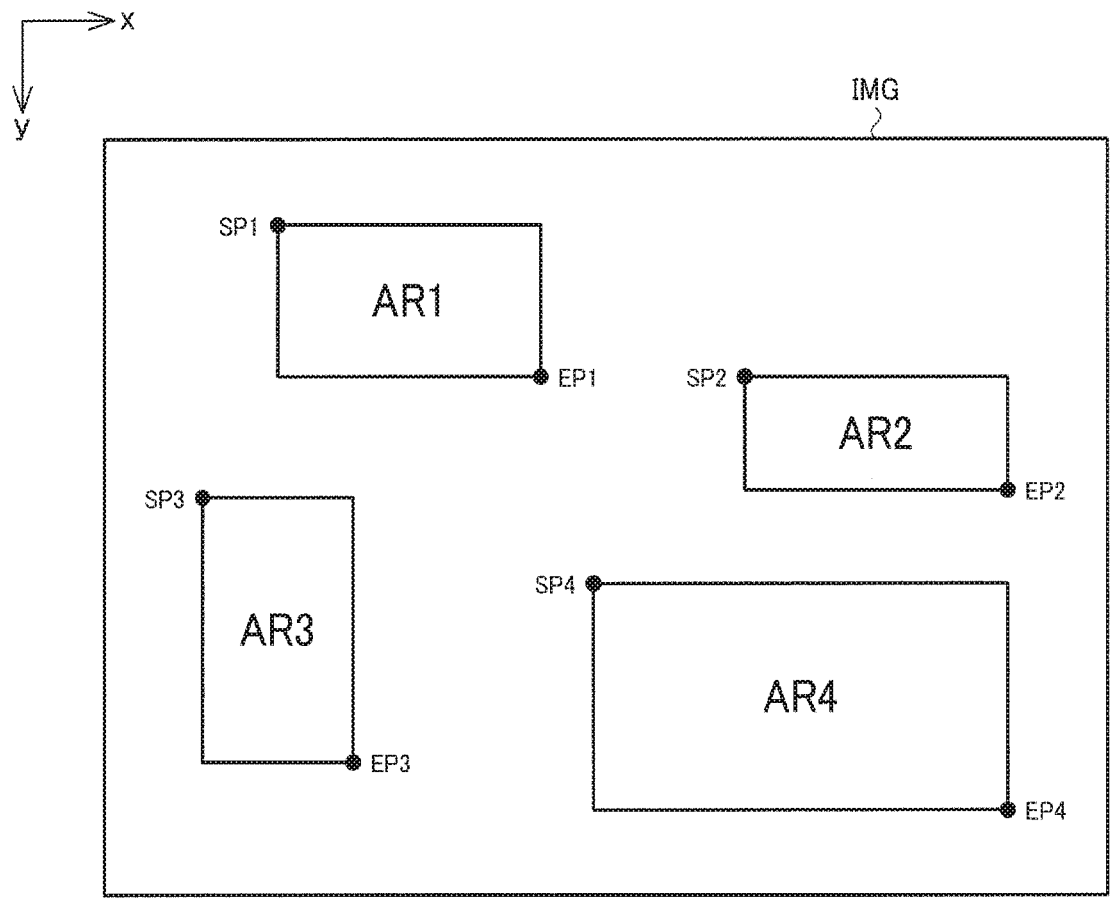
FIG. 4 is an exemplary setting of an error detection region.

The region to be the target of the error detection is not limited to either of the entirety of the display region of the display panel 500 or the warning information display region, and more flexible setting can be performed. In an example in FIG. 4, first to fourth error detection regions AR1 to AR4 are set to an image (IMG) corresponding to the display region of the display panel 500. Position information is used to specify the error detection regions AR1 to AR4. The position information, here, is start points SP1 to SP4 and end points EP1 to EP4 of the error detection regions. For example, a coordinate x in a horizontal scan direction and a coordinate y in a vertical scan direction are defined using the coordinates of the upper left pixel of the image IMG, for example. The pixel having the smallest coordinate x and the smallest coordinate y is the start point and the pixel having the largest coordinate x and the largest coordinate y is the end point.

Note that the number of error detection regions is not limited to four, and one or any number of plurality of error detection regions can be set. Also, in FIG. 4, the error detection regions AR1 to AR4 are regions that do not overlap, but the error detection regions are not limited thereto, and may be regions that partially overlap. Also, the position information for designating the error detection region is not limited to the start point and the end point, and may be information with which the region can be defined. For example, the position information may include the coordinates of the start point of the error detection region and a horizontal width (number of pixels in a horizontal scan direction) and a vertical width (number of pixels in a vertical scan direction).

The error detection unit 233 acquires the position information for specifying the error detection region, and performs the error detection on the error detection region specified by the position information as the target. The position information may be stored in the register unit 235. In this case, the error detection unit 233 reads out the position information from the register unit 235, and performs the error detection on the pixel data corresponding to the position information out of the image data as the target. The position information can be acquired from the processing device 100 via the interface unit 210. Although not shown in FIG. 3, the interface unit 210 of the display controller 200 may include a display interface unit and a command interface unit. Also, the position information may be acquired via the display interface unit, or via the command interface unit.

The position information to be stored in the register unit 235 may be fixed values. In this case, the error detection unit 233 may continue the error detection targeting at the error detection regions AR1 to AR4, shown in FIG. 4, over a plurality of frames. Alternatively, a modification may be implemented in which the error detection targeting at the first error detection region AR1 is performed in the first frame, and the error detection targeting at the second error detection region AR2 is performed in the second frame, and the like. That is, in the case where a plurality of pieces of position information are stored in the register unit 235, various modifications can be implemented with respect to the order of use and a combination of the plurality of pieces of position information.

Also, the position information stored in the register unit 235 may be updated, as appropriate. For example, as a result of updating the position information frame by frame, more flexible setting of the error detection region is enabled. Note that, in the case where the position information to be stored in the register unit 235 is frequently updated, because the processing of writing/reading out to/from the register is performed at a high frequency, the processing load increases.

By taking this point into consideration, the position information may be included in the image data. The interface unit 210 (display interface unit) receives data including image data and position information regarding the error detection region, and the error detection unit 233 performs the error detection based on the image data of the error detection region specified by the position information. The position information may be transmitted in a horizontal flyback period that is a period from when one line in the horizontal direction has ended to when display of next line is started. Alternatively, the position information may be transmitted in a vertical flyback period that is a period from when one frame of image has been displayed until when the display of the next frame of data is started. Alternatively, the position information may be added before and after the image data (display image data), or may be added in the middle of the image data. In this way, the position information can be received frame by frame using the interface unit 210 (display interface unit) that receives the image data, and as a result, flexible setting of the error detection region is enabled.

Note that the display region in the electro-optical panel of the image data (first image data) on which the display controller 200 performs the error detection (first error detection) may be different from the display region in the electro-optical panel of the image data (second image data) on which the driver 300 performs the error detection (second error detection).

In this way, the region on which the error detection is performed can be flexibly set in each of the display controller 200 and the driver 300. For example, the error detection may be performed on the warning information display region in the driver 300, as described above, and the error detection may be performed on the first to fourth error detection regions AR1 to AR4 in the display controller 200. The number of regions on which the error detection is performed in the driver 300 is preferably smaller than the number of regions on which the error detection is performed in the display controller 200. In this way, the amount of data on which the error detection is performed in the driver 300 is smaller than the amount of data on which the error detection is performed in the display controller 200, and as a result, the computation load in the driver 300 can be reduced. For example, the error detection in the driver 300 is performed on at least one region selected from the regions on which the error detection is performed in the display controller 200. Specifically, the error detection unit 333 of the driver 300 performs the error detection on one to three regions selected from the error detection regions AR1 to AR4.

In addition, the region on which the error detection is performed can be variously set in the display controller 200 and the driver 300. Of course, the error detection may be performed on the same region in the display controller 200 and the driver 300.

Transmission of Expectation Value from External Device

In the first error detection, an example in which the expectation value of the error detection is a fixed value has been described. However, the expectation value may be, without fixing, a value that changes frame by frame in accordance with the image data. In this case, the processing device 100 computes the expectation value (CRC value) for error detection based on the image data to be transmitted. The expectation value is computed in each of the error detection regions, and expectation values corresponding to the AR1 to AR4 are computed in the example in FIG. 4. In an example in which three R, G, and B expectation values are used in one error detection region, 12 expectation values are to be computed so as to correspond to the AR1 to AR4.

The display controller 200 receives the expectation value of the computed value in the error detection from the processing device 100, detects whether or not the computed value in the error detection matches the expectation value, and as a result, the error detection (first error detection) is performed. Specifically, the expectation value is received via the interface unit 210, and the error detection is performed in the error detection unit 233. In an example in which the error detection region is set as described above, the error detection unit 233 may perform the error detection based on the image data, the position information, and the expectation value.

The point that the expectation value may be acquired via the display interface unit, or may be acquired via the command interface unit is similar to the position information. Also, the point that the expectation value may be stored in the register unit 235, or the expectation value that has been acquired via the display interface unit may be directly used is similar to the position information as well.

3. Example in which Plurality of Drivers are Used

An example in which one driver 300 (source driver) is provided is illustrated in FIG. 1. However, a plurality of drivers 300 are provided in many cases. For example, a case is conceivable in which one driver 300 cannot drive all the data lines in the display panel 500 due to limitations in the IC size and the allowable terminal pitch of the driver 300, and the like. Specifically, in the case where the number of data lines increases due to advancements in the resolution of the display panel 500, the likelihood that a plurality of drivers 300 are needed increases.

Figure 5:
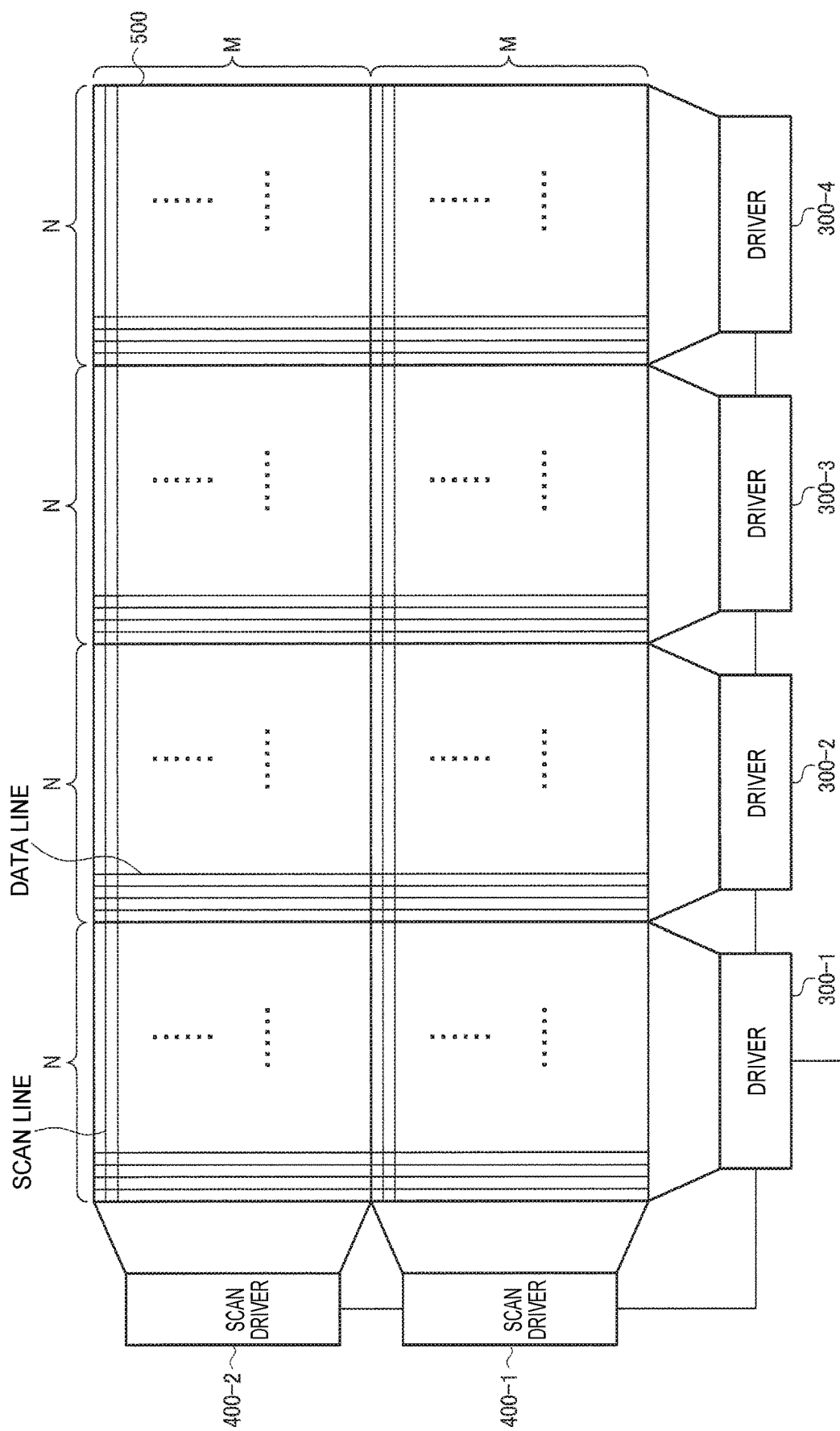
FIG. 5 is an exemplary connection between a plurality of drivers, a scan driver, and a display panel.

FIG. 5 shows an exemplary connection of the display panel 500, the drivers 300 (source driver), and the scan drivers 400 in the case where a plurality of drivers 300 are used. In the example in FIG. 5, the display panel has 4×N data lines. Four drivers 300 (drivers 300-1 to 300-4) that each drive N data lines are provided, and the 4×N data lines of the display panel 500 are driven by the four drivers 300. Note that an example in which four drivers 300 are provided is illustrated in FIG. 5, but the number of drivers 300 may be two, three, or five or more.

Also, in the example in FIG. 5, the display panel 500 has 2×M scan lines. Two scan drivers 400 (scan drivers 400-1 to 400-2) that each performs scanning of M scan lines are provided, and the 2×M scan lines of the display panel 500 are scanned by the two scan drivers 400. Note that various modifications can be implemented in terms of the number of scan drivers 400.

The drivers 300-1 to 300-4 of the plurality of drivers 300 each supply data signals to the data lines based on the command and image data from the display controller 200 (or processing device 100). The data signal, here, is a signal (analog voltage in a narrow sense) to be generated based on the image data. Note that a display control signal (display timing signal, cascade signal) is generated by the driver 300-1, and is supplied from the driver 300-1 to the drivers 300-2 to 300-4. Also, the display control signal used in the scan drivers 400-1 and 400-2 is also supplied from the driver 300-1.

The driver 300 (driver 300-1, in the example in FIG. 5) that generates the display control signal is referred to as a master, and the driver 300 (drivers 300-2 to 300-4, in the example in FIG. 5) that receives supply of the display control signal generated in another driver 300 is referred to as a slave. Also, in the case where the driver 300 includes a built-in power supply (power supply circuit 350), a driver 300 in which the built-in power supply is turned on is the master, and a driver 300 in which the built-in power supply is turned off is the slave. Each driver 300 can be set to be a master or slave using a signal input to a given terminal, for example. With regards to the scan driver 400 as well, the scan driver 400-1 may be set to be a master, and the scan driver 400-2 may be set to be a slave.

In the case where the plurality of drivers 300 are provided, the above-mentioned error detection (second error detection) can be performed in each driver 300. In this case, each driver 300 may transmit the error detection result to the external device. However, in the case of outputting the error detection result using the error output terminal TE as described above, the external device that receives error detection results needs to have a number of error input terminals that corresponds to the number of drivers 300.

Therefore, in the case where the driver 300 is set to be a master, the interface unit 310 may output the results of error detections of the other drivers that are each set to a slave to the external device. In other words, in the case where the display system 600 includes a second driver that is different from the driver 300 shown in FIG. 1 and the like, and the driver 300 has been set to be a master and the second driver has been set to be a slave, the driver 300 that has been set to be the master outputs the result of error detection (second error detection) performed in the second driver that has been set to be the slave.

In this way, the driver 300 that has been set to a master is set to output the error detection result, and the external device can easily acquire the error detection result. In the example in which the above-described error output terminal TE is used, it is sufficient that one error input terminal is provided in the external device regardless of the number of drivers 300.

Figure 6:
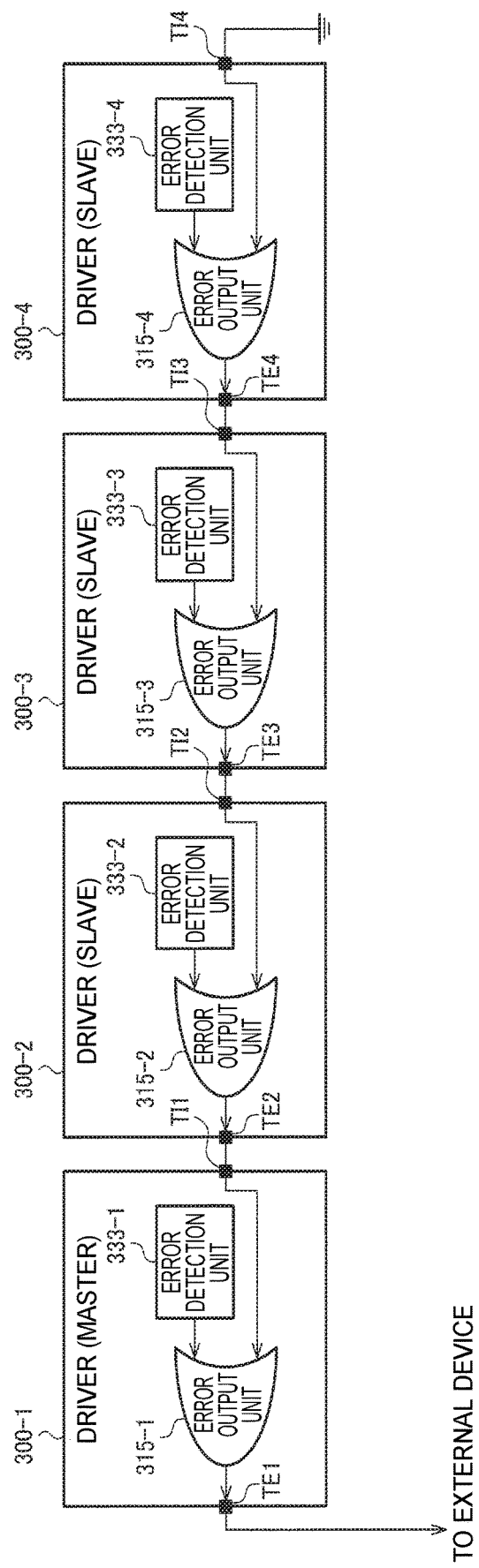
FIG. 6 is an exemplary output of an error detection result from the plurality of drivers.

FIG. 6 is an exemplary connection in the case where the driver 300 that has been set to be a master outputs the error detection result of drivers 300 that have been set to be a slave. In FIG. 6, the driver 300-1 is set to be a master, and the drivers 300-2 to 300-4 are each set to a slave. Note that, since the configuration of the driver 300 has been described using FIG. 2, the description of each driver 300 is simplified in FIG. 6. Also, the number of drivers 300 is not limited to four. In addition, the configuration in which a plurality of drivers 300 are included is not limited to that in FIG. 6, and various modifications can be implemented such as omitting some of the constituent elements and adding another constituent element.

As shown in FIG. 6, each driver 300 (300-1 to 300-4) includes an error detection unit 333 (333-1 to 333-4) and an error output unit 315 (315-1 to 315-4). Here, each error output unit 315 may be an OR circuit that outputs a logical sum of input signals. Each error output unit 315 outputs a logical sum of a signal that is input to a terminal TI (TI-1 to TI-4) and an output of the own error detection unit 333 to an error output terminal TE (TE-1 to TE-4). Note that, in the following, an example in which the error detection unit 333 outputs a signal at a high level when the computed value and the expectation value does not match (when CRC error is detected), and outputs a signal at a low level when the values match will be described.

A low potential-side reference voltage (ground, in a narrow sense) is supplied to the terminal TI-4 of the driver 300-4 that has been set to be a slave. Therefore, the error output unit 315-4 outputs a signal at a high level when the output of the error detection unit 333-4 is at a high level, and outputs a signal at a low level when the output is at a low level. That is, the output of the error output terminal TE-4 is a signal that represents the result of error detection performed in the driver 300-4.

The terminal TI-3 of the driver 300-3 that has been set to be a slave is connected to the error output terminal TE-4 of the driver 300-4. Therefore, the error output unit 315-3 outputs a logical sum of the results of error detection performed in the error detection units 333-3 and 333-4. That is, the error output unit 315-3 outputs a signal at a high level when at least one of outputs of the error detection units 333-3 and 333-4 is at a high level, and outputs a signal at a low level when both outputs are at a low level.

The terminal TI-2 of the driver 300-2 that has been set to be a slave is connected to the error output terminal TE-3 of the driver 300-3. Therefore, the error output unit 315-2 outputs a logical sum of the results of error detection performed in the error detection units 333-2 to 333-4. That is, the error output unit 315-2 outputs a signal at a high level when at least one of outputs of the error detection units 333-2 to 333-4 is at a high level, and outputs a signal at a low level when all of the outputs are at a low level.

The terminal TI-1 of the driver 300-1 that has been set to be a master is connected to the error output terminal TE-2 of the driver 300-2. Therefore, the error output unit 315-1 outputs a logical sum of the results of error detection performed in the error detection units 333-1 to 333-4. That is, the error output unit 315-1 outputs a signal at a high level when at least one of outputs of the error detection units 333-1 to 333-4 is at a high level, and outputs a signal at a low level when all of the outputs are at a low level. The error output terminal TE-1 of the driver 300-1 that has been set to be a master is connected to the external device.

In this way, the driver 300 (300-1) that has been set to be a master can output the results of error detection performed in the drivers 300 (300-2 to 300-4) that each have been set to be a slave.

Note that, in FIG. 6, each error output unit 315 is illustrated as a simple OR circuit, but the error output unit 315 is not limited to a simple OR circuit. For example, the number of CRC errors may be counted in the error output unit 315, as described above. In this case, the error output unit 315 may include an unshown counter and the like, and output a logical sum of a signal whose level (high level/low level) is determined based on a count value, and a signal input to the terminal TI.

Also, in each driver 300, the error detection may be enabled or disabled, and in this case, each driver 300 may include a setting terminal for setting whether or not the error detection is enabled. In the driver 300 in which the error detection has been disabled, the error detection unit 333 is inactivated, and the output of the error detection unit 333 is fixed at a low level (signal indicating that there is no error, in a broad sense).

Also, as shown in FIGS. 1 and 5, the display system 600 includes the scan driver 400 (gate driver). Image data is not used in the scan driver 400, and therefore error detection with respect to the image data is not required. However, a case where error detection is performed in the scan driver 400 as well is conceivable. For example, the scan driver 400 may sequentially scan the scan lines, and generate a signal when the final scan is ended (when control to display one frame of image is ended). The scan driver 400 outputs an error in the case of not generating the signal. In this way, the error detection as to determining whether or not display control is appropriately performed is possible.

In the case where the scan driver 400 can output the error detection result, if the scan driver 400 outputs a signal to the external device, the number of terminals of the external device increases.

Therefore, the driver 300 may receive the result of error detection performed in the scan driver 400 from the scan driver 400. More specifically, the interface unit 310 of the driver 300 outputs the result of error detection performed in the scan driver that drives scan lines of the electro-optical panel to an external device. In the case where a plurality of drivers 300 are provided, the driver that output the result of error detection in the scan driver 400 is a driver 300 that has been set to a master. Note that, in the case where a plurality of scan drivers 400 are provided, as shown in FIG. 5, the scan driver 400-1, which is a master, receives the result of error detection in the scan driver 400-2, which is a slave, and outputs the received result of error detection and the result of its own error detection to the driver 300 (driver 300-1 serving as a master).

In this way, the driver 300 can also collectively output the result of error detection in the scan driver 400.

4. Setting of Sensitivity (Rate) of Error Detection and the Like

The error detection (second error detection) in the driver 300 and the error detection (first error detection) in the display controller 200 may be performed, as described above. In the present embodiment, the two error detections may be different.

Specifically, the sensitivity (likelihood of error being detected) of the first error detection in the display controller 200 may be different from the sensitivity of the second error detection in the driver 300. The sensitivity of error detection can be set in various methods. For example, the rate (frequency) with which the error detection is performed may be adjusted. The first error detection is performed once in f1 (f1 is an integer of one or more1) frames, and the second error detection is performed once in f2 (f2 is a positive integer different from f1). If f1<f2, the first error detection is performed at a higher frequency than the second error detection, and the sensitivity of the first error detection is higher than the sensitivity of the second error detection.

Alternatively, in the case of counting the number of CRC errors in the error output unit 215 and the error output unit 315, the threshold values of the count values may be different. For example, the error output unit 215 of the display controller 200 outputs an error when the count value becomes C1 or more, and the error output unit 315 of the driver 300 outputs an error when the count value becomes C2 (C2≠C1) or more. The smaller the threshold value, the smaller the number of detections of the CRC error at which an error is output, and as a result, the sensitivity of error detection increases. If C1<C2, the allowable number of CRC errors in the first error detection decreases, and the sensitivity of the first error detection is higher than the sensitivity of the second error detection In this way, the sensitivity of error detection can be flexibly set in each of the drivers 300 and the display controllers 200. Specifically, in the present embodiment at least one of f1<f2 and C1<C2 may be set. In other words, the sensitivity of the first error detection may be set to be higher than the sensitivity of the second error detection. The communication between the processing device 100 and the display controller 200 is performed at a higher speed than that between the display controller 200 and the driver 300, and an error is likely to occur. That is, the sensitivity is increased with respect to data that the display controller 200 receives and in which an error is likely to occur, and the sensitivity is lowered with respect to data that the driver 300 receives and in which an error is unlikely to occur, and as a result, an appropriate error detection becomes possible in accordance with the situation.

Also, in the case of using a plurality of drivers 300, the error detection (second error detection) may be performed in each of the drivers 300. In the present embodiment, error detections in the drivers 300 may differ, For example, the error detection unit 333 of the driver 300 performs the error detection at a sensitivity different from the sensitivity of the error detection performed in the other drivers that drive the electro-optical panel. In this way, the sensitivity of error detection can be flexibly set in each of the drivers 300. For example, in the case where important information is to be displayed in a central portion of the display region of the display panel 500, the sensitivity of error detection in the driver 300 that drives the data lines corresponding to the central portion is relatively increased, and the sensitivity in a driver 300 that drives data lines on an end side is relatively decreased. In the example in FIG. 5, the sensitivity of error detection in each of the drivers 300-2 and 300-3 is increased relative to the drivers 300-1 and 300-4. More specifically, the sensitivity of error detection in the driver 300 that drives data lines corresponding to the warning information display region may be relatively increased. Note that the sensitivity of error detection may be adjusted by changing the rate (error detection is to be performed once per how many frames) of the error detection performed in the error detection unit 333, as described above, or by changing the threshold value in the case where the error output unit 315 counts the number of errors.

Alternatively, the error detection itself may be inactivated in some drivers 300. For example, the error detection in each driver may be enabled or disabled using a terminal, as described using FIG. 6 as well. The driver 300 corresponding to the region (warning information display region, for example) in which important information is to be displayed is activated, and the other drivers 300 are inactivated. In this method as well, the sensitivity of error detection can be changed between the plurality of drivers 300.

Alternatively, the error output of a driver 300 (error output unit 315) may be enabled or disabled, instead of fixing the output of the error detection unit 333. For example, a configuration may be adapted in which only the error output of the driver 300 corresponding to the warning information display region is enabled, and the outputs of the other drivers 300 are disabled. In this method as well, the sensitivity of error detection can be changed between the plurality of drivers 300.

Also, the control unit 330 of the driver 300 may perform detection of an abnormality that is different from the error detection in the error detection unit 333. For example, the control unit 330 may determine a signal abnormality or connection abnormality with an external device based on whether or not a clock signal is supplied. The determination of the signal abnormality and connection abnormality is performed by the detection circuit 360 shown in FIG. 2, for example.

When a signal abnormality or connection abnormality is detected, the control unit 330 may perform control such that the display in the display panel 500 is turned off. For example, the control unit 330 performs control such that black color is displayed over the entire display region. In this way, the display of unsuitable information can be suppressed. From the viewpoint of suppressing the display of unsuitable information, the control unit 330 may turn off the display when the error detection unit 333 detects an error.

However, a case is conceivable where, when a signal abnormality or connection abnormality occurs, normal display operation (driving of display panel 500) itself is difficult. On the other hand, the CRC error occurs at some frequency, as described above. Therefore, when the control unit 330 turns off the display, a signal abnormality or connection abnormality may be differentiated from the error detection in the error detection unit 333.

Specifically, the driver 300 includes the control unit 330 (drive control unit 331) that performs drive control on the drive circuit 340, the control unit 330 performs control such that the display is turned off when a signal abnormality or connection abnormality has been detected k times (k is a positive integer), and performs control such that the display is turned off when an error is detected j times (j is an integer that satisfies j>k) by the error detection unit 333.

In this way, while taking into consideration the difference in the importance (severity) between the signal abnormality or connection abnormality and the error detection, the display can be controlled to be turned off. With respect to the signal abnormality or connection abnormality, normal operation is difficult, as described above, and therefore k is set to a sufficiently small value (k=1, for example). In contrast, with respect to the CRC error, the error may be allowed to occur some number of times. Also, here, the control performed by the control unit 330 of the driver 300 has been described, but similar control may be performed by the control unit 230 of the display controller 200.

5. Modifications

In the above, an example in which a terminal for outputting a signal that indicates whether or not an error has occurred is used as the error output terminal TE has been described. But, there is no limitation thereto, and the driver 300 may include a terminal from which an external device reads out data for specifying the type of error (hereinafter, type specifying data) as the error output terminal TE. The external device (display controller 200) reads out the type specifying data stored in the driver 300 via the terminal in order to specify the type of error.

Here, various specific examples of the type specifying data are conceivable. For example, in the case where a plurality of drivers 300 are provided, the type specifying data may be data that indicates the driver in which an error has been detected. Alternatively, in the case where the error detection is performed in the scan driver 400, the type specifying data may be a piece of information indicating in which of the driver 300 and the scan driver 400 the error has been detected. Also, in the case where the error detection based on the CRC error and the detection of abnormalities such as a signal abnormality or connection abnormality are performed in the driver 300, the type specifying data may be a piece of information indicating which of them has been detected. Also, in the case where both of the accumulated number of occurrences and successive number of occurrences of the CRC errors can be counted in the error detection unit 333 of the driver 300, the type specifying data may be data indicating which of the counts has exceeded the threshold value. Other than that, the driver 300 of the present embodiment can detect various types of errors and abnormalities, and the data for specifying which of them has been detected can be used as the type specifying data.

6. Electro-Optical Device, Electronic Apparatus, and Mobile Body

The method of the present embodiment can be applied to various devices that include the above-described driver 300 (display system 600). For example, the method of the present embodiment can be applied to an electro-optical device that includes the driver 300 (display system 600) and the electro-optical panel (display panel 500). Also, the method of the present embodiment can be applied to an electronic apparatus and a mobile body that include the driver 300 (display system 600).

Figure 7:
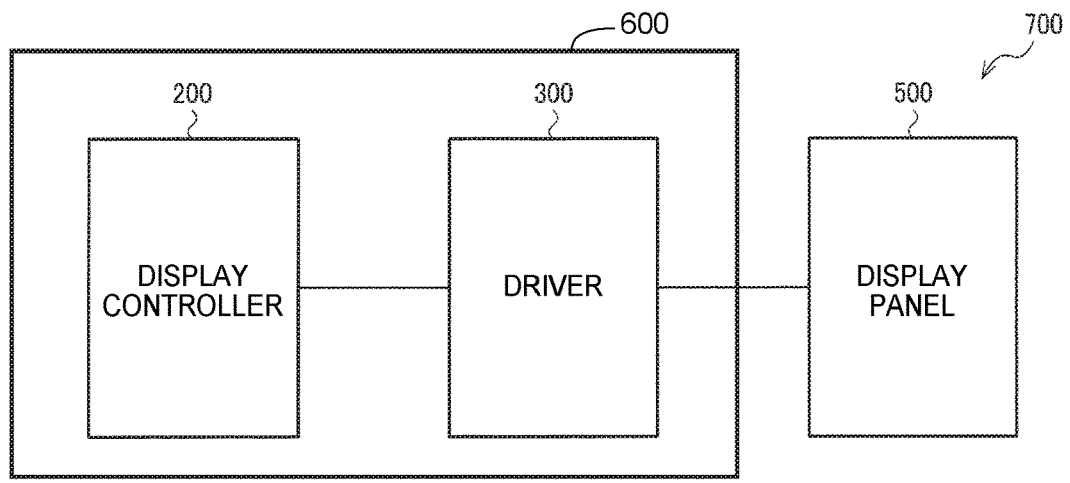
FIG. 7 is an exemplary configuration of an electro-optical device.

An exemplary configuration of an electro-optical device 700 (display device) that includes the display system 600 of the present embodiment is shown in FIG. 7. The electro-optical device 700 includes the display controller 200, the driver 300, and the display panel 500.

The display panel 500 is constituted by a glass substrate and a pixel array (liquid crystal cell array) formed on the glass substrate, for example. The pixel array includes pixels, data lines, and scan lines. The driver 300 is mounted on the glass substrate, and the driver 300 and the pixel array are connected by an interconnect group that is formed by transparent electrodes (ITO: Indium Tin Oxide). The display controller 200 is mounted on a circuit board that is different from the glass substrate, and the circuit board and the glass substrate are connected by a flexible board or the like. Note that the electro-optical device 700 is not limited to this configuration. For example, the driver 300 and the display controller 200 are mounted on a circuit board, and the circuit board and the display panel 500 may be connected by a flexible board or the like. Note that the display panel 500 may be a liquid crystal display (LCD), but is not limited thereto. For example, the display panel 500 may be a display (organic EL (Electro-Luminescence) display (OELD)) that uses an OLED (Organic Light Emitting Diode).

Figure 8:
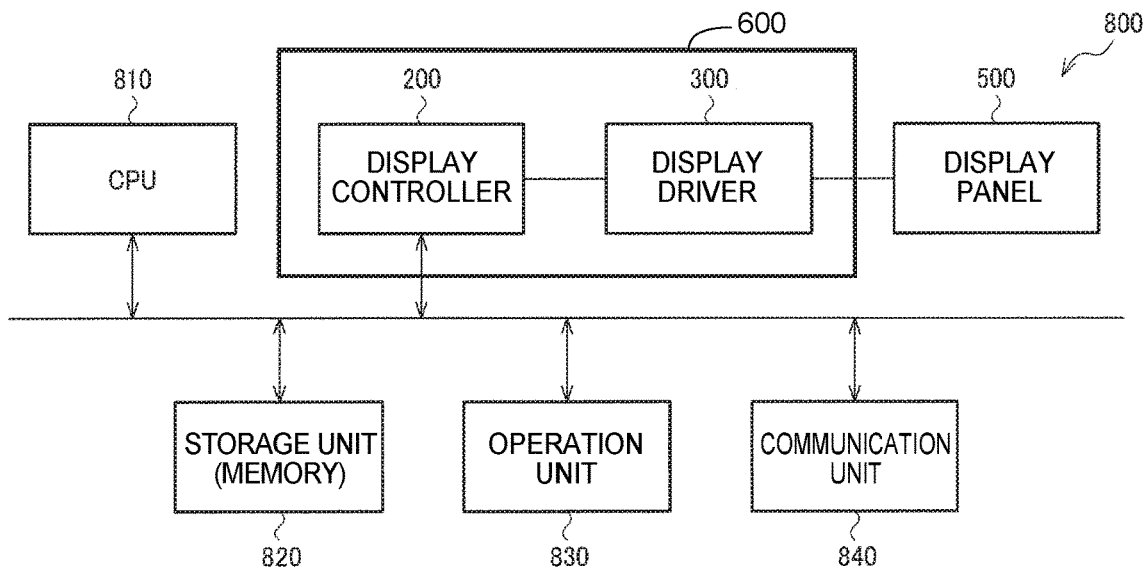
FIG. 8 is an exemplary configuration of an electronic apparatus.

An exemplary configuration of an electronic apparatus 800 including the display system 600 of the present embodiment is shown in FIG. 8. Various electronic apparatuses on which display devices are mounted, such as an in-vehicle display device (such as meter panel, for example), a display, a projector, a television device, an information processing device (computer), a mobile information terminal, a car navigation system, a mobile gate terminal, and a DLP (Digital Light Processing) device, can be envisioned as the electronic apparatus of the present embodiment.

The electronic apparatus 800 includes a CPU 810 (processing device 100), the display controller 200, the driver 300, the display panel 500, a storage unit 820 (memory), an operation unit 830 (operation device), and a communication unit 840 (communication circuit, communication device).

The operation unit 830 is a user interface for receiving various operations made by a user. For example, the operation unit 830 is constituted by a button, a mouse, a keyboard, a touch panel attached to the display panel 500, and the like. The communication unit 840 is a data interface for communicating (transmission, reception) image data and control data. For example, the communication unit 840 is a wired communication interface such as a USB or a wireless communication interface such as a wireless LAN, for example. The storage unit 820 stores image data input from the communication unit 840. Alternatively, the storage unit 820 functions as a working memory of the CPU 810. The CPU 810 performs processing to control the units of the electronic apparatus 800, and various types of data processing. The display controller 200 performs processing to control the driver 300. For example, the display controller 200 converts the format of image data transferred form the communication unit 840 or the storage unit 820 via the CPU 810 to a format that can be accepted by the driver 300, and outputs the converted image data to the driver 300. The driver 300 drives the display panel 500 based on the image data that has been transferred from the display controller 200.

Figure 9:
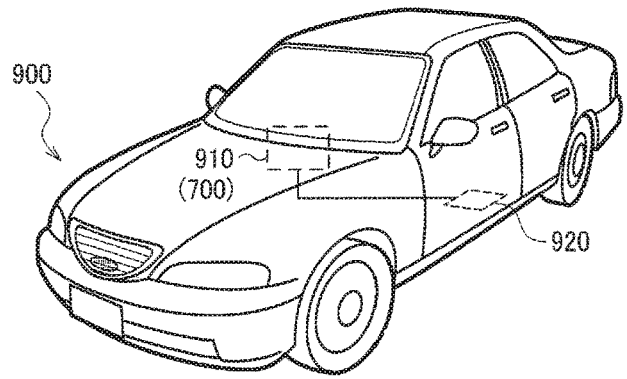
FIG. 9 is an exemplary configuration of a mobile body.

An exemplary configuration of a mobile body that includes the display system 600 of the present embodiment is shown in FIG. 9. Various types of mobile bodies such as a car, an airplane, a motorcycle, a ship, and a robot (mobile robot, walking robot) can be envisioned as a mobile body of the present embodiment, for example. The mobile body is an apparatus or device that includes a drive mechanism such as an engine or a motor, a steering mechanisms such as a steering wheel or a rudder, and various electronic apparatus, for example, and moves on the ground, in the air, and on the sea.

FIG. 9 schematically illustrates an automobile 900 serving as a specific example of the mobile body. A display device 910 (electro-optical device 700) including the display system 600 (display controller 200, driver 300) and an ECU 920 (processing device 100) that controls the units of the automobile 900 are built in the automobile 900. The ECU 920 generates an image (image data) that shows pieces of information such as speed, remaining fuel amount, travel distance, and settings of various types of devices (air conditioner, for example) to a user, and transmits the image to the display device 910 so as to cause the display panel 500 to display the image.

Note that, although the present embodiment has been described in detail as described above, a person skilled in the art will appreciate that numerous modifications can be made without substantially departing from the novel matter and effects of the invention. Accordingly, all such modifications are intended to be embraced within the scope of the invention. For example, terms that appear in the description or drawings at least once together with other broader or synonymous terms can be replaced by those other terms in any part of the description or drawings. Also, all the combinations of the present embodiment and the modifications are embraced within the scope of the invention. Also, the configurations and operations of the processing device, the display controller, the driver, the electro-optic device, the electronic apparatus, and a moving body are not limited to those described in the embodiment, and various modifications can be implemented.

What is claimed is:

1. A driver comprising:
   an interface that receives image data to which dummy data has been added from an external processor, the dummy data being configured to result in a fixed value when computed in error detection;
   an error detector that performs error detection on the received image data by detecting whether or not a computed value in the error detection matches the fixed value; and
   a drive circuit that drives an electro-optical panel based on the image data,
   wherein a result of the error detection is output to the external processor.

2. The driver according to claim 1, further comprising:
   an error output terminal for outputting the result of the error detection.

3. The driver according to claim 1, wherein the interface outputs the result of the error detection to the external processor.

4. The driver according to claim 1, wherein, in a case where the driver has been set to be a master, the interface outputs a result of error detection received from another driver that has been set to be a slave, to the external processor.

5. The driver according to claim 1, wherein the error detector performs the error detection at a sensitivity that is different from a sensitivity of error detection in another driver that drives the electro-optical panel.

6. The driver according to claim 1, wherein the interface outputs a result of error detection performed in a scan driver that drives a scan line of the electro-optical panel to the external processor.

7. The driver according to claim 1, wherein the error detector performs the error detection on upper m bits out of n bits of the image data, and does not perform the error detection on lower n-m bits.

8. The driver according to claim 1, wherein the error detector performs the error detection on the image data for a warning information display region out of a display region of the electro-optical panel.

9. The driver according to claim 1, further comprising a controller that performs control to drive the drive circuit,
   wherein the controller, when a signal abnormality or connection abnormality has been detected k times (k is a positive integer), performs control to turn off display, and
   when an error has been detected j times (j is an integer that satisfies j>k) by the error detector, performs control to turn off display.

10. The driver according to claim 1, wherein the interface unit includes:
    a display interface that receives the image data; and
    a command interface that receives display setting data,
    wherein the error detector performs error detection on the display setting data received by the command interface.

11. An electro-optical device comprising:
    the driver according to claim 1;
    the electro-optical panel; and
    the external processor.

12. The electro-optical device according to claim 11, further comprising a second driver that is different from the driver,
    wherein the sensitivity of error detection in the driver is higher than the sensitivity of error detection in the second driver.

13. An electronic apparatus comprising the driver according to claim 1.

14. A display system comprising:
    a display; and
    a display driver that drives the display, the display driver including:

an interface that receives image data to which dummy data has been added from an external processor, the dummy data being configured to result in a fixed value when computed in error detection;

an error detector that performs error detection on the received image data by detecting whether or not a computed value in the error detection matches the fixed value; and a drive circuit that drives the display based on the image data, wherein a result of the error detection is output to an external processor.

15. The driver according to claim 1, wherein the dummy data is a Cyclic Redundancy Check (CRC) value for the image data.

16. The driver according to claim 15, wherein a bit string of zeroes is added to the image data before the CRC value is calculated.

* * * * *